UNITED STATES PATENT OFFICE.

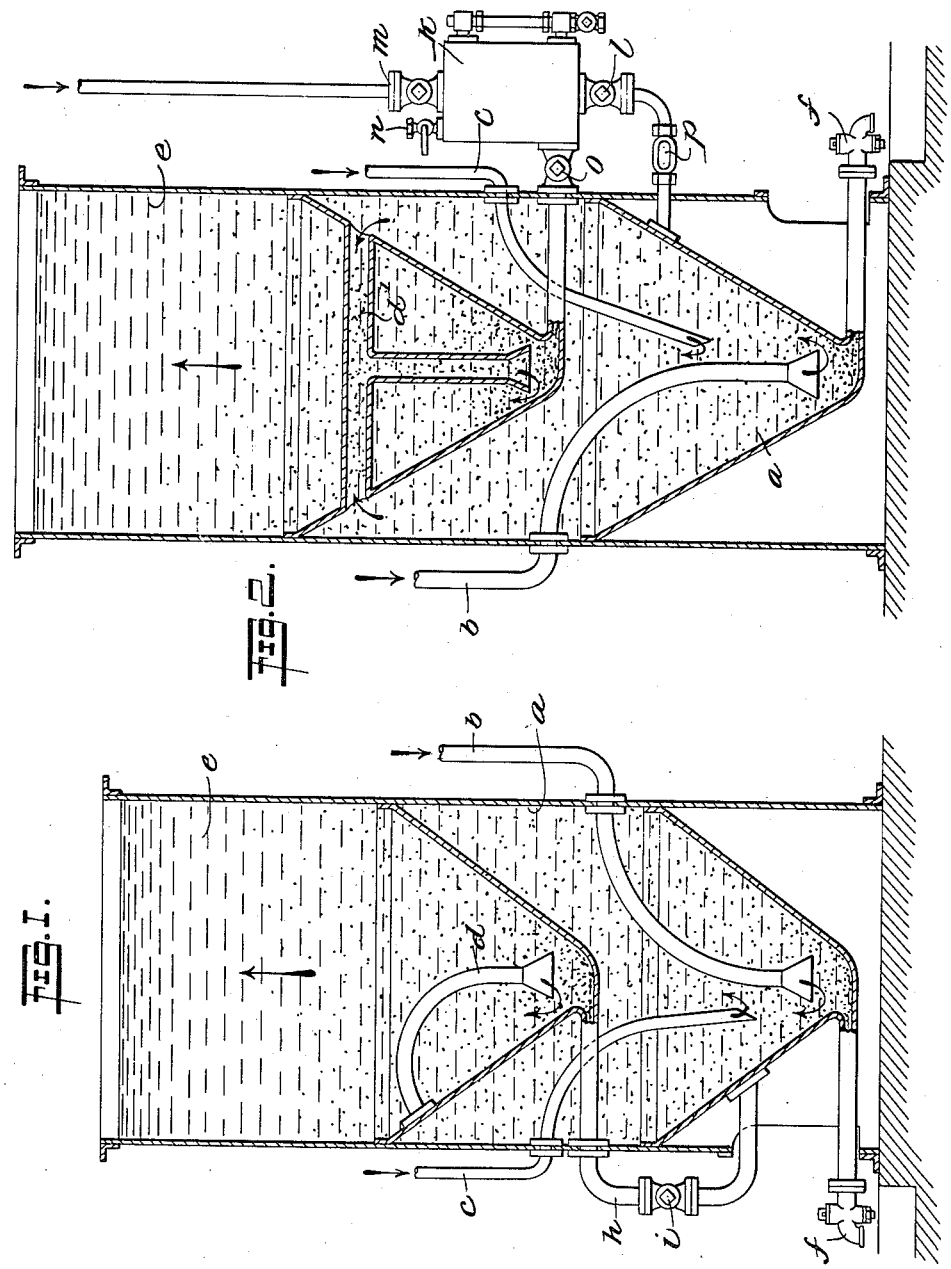

PAUL MÜNZER, OF BRAUNSFELD, NEAR COLOGNE, GERMANY, ASSIGNOR TO REISERT AUTOMATIC WATER PURIFYING COMPANY, A CORPORATION OF NEW JERSEY.

PROCESS FOR PURIFYING WATER CONTAINING MINERAL SALTS.

1,199,099.  Specification of Letters Patent.  Patented Sept. 26, 1916.

Original application filed January 28, 1910, Serial No. 540,554. Divided and this application filed March 24, 1916. Serial No. 87,164.

*To all whom it may concern:*

Be it known that I, PAUL MÜNZER, a subject of the Emperor of Germany, residing at Braunsfeld, near Cologne, Germany, have invented certain new and useful Improvements in Processes for Purifying Water Containing Mineral Salts, of which the following is a specification.

This invention relates to a process for the purification of water by means of a barium salt or the like, particularly carbonate of barium. The present application is a division of my allowed patent application Serial No. 540,554, filed January 28, 1910.

In the purification of water by the aid of lime and carbonate of barium the necessary quick lime required for the removal of the bi-carbonate of calcium, and of the magnesia is added to the water to be purified in the form of a saturated aqueous solution of lime in exactly measured quantity, while the carbonate of barium requisite for the removal of the sulfate of lime must be added in large excess and be continuously penetrated by the entire quantity of water to be purified. In consequence of the admixture of the saturated solution of lime, the space available for the purification with barium in which the carbonate of barium is placed (the so-called barium bath) is considerably occupied by the deposit formed from the bi-carbonate. The carbonate of barium is gradually rendered impure by the deposit of this mud which is of no value for the purification process, so that finally in order to obtain the necessary space for the carbonate of barium, a large proportion of the mud, which nevertheless contains a large part of the still available carbonate of barium, must be thrown away. In order to prevent this loss of the useful carbonate of barium and to utilize the same to the uttermost, the present invention has been made. This invention consequently is designed to effect the removal of the bi-carbonates from the water to be purified in special receptacles before the water can enter the barium bath, and the first mentioned space must be cleaned out more frequently and in it moreover may be deposited the residues from the barium bath before these latter are entirely thrown away. By this means one is enabled to exhaust the last remainders that is the unspent carbonate of barium.

Apparatus for carrying out my process is illustrated in section in various forms in Figures 1 and 2 of the drawings.

Fig. 1 is a sectional view of one form of the apparatus for carrying out the process. Fig. 2 is a sectional view of another form of the apparatus for carrying out the process.

The crude water flows into the chamber $a$ through the tube $b$ and the saturated solution of lime through a tube $c$; this solution requisite for the removal of the bi-carbonates having been prepared in a separate vessel or saturator of any convenient or known construction.

The mixture rises and passes after the chemical reaction is complete and the precipitant formed has been for the most part separated by settling through the pipe $d$ (Fig. 1) or the branch pipes $d'$ (Fig. 2) into the barium bath in the vessel $e$, at this point the second step of the process is carried out. The precipitate produced in the chamber $a$ collects underneath in the cone of this chamber and is discharged therefrom through the cock $f$. In the chamber $a$ carbonate of barium in excess and in the floating condition is penetrated by the water and the sulfate of lime is converted into the insoluble sulfate of barium. From time to time a portion of the precipitate which still contains carbonate of barium is run off out of the chamber $e$ into the chamber $a$. The water passing into this chamber which still contains its entire amount of sulfuric acid, exhausts the remaining portion of the carbonate of barium. It cannot, however, be entirely freed from the sulfuric acid by this means, but by consuming the carbonate of barium it renders the removal of the precipitate possible without waste of barium and the consequent maintenance of a quantity of precipitate or mud in the vessel $e$ containing the barium bath together with the necessary excess of carbonate of barium requisite for the complete removal of the sulfuric acid.

In carrying out the process as shown in Fig. 1, the removal of a portion of the precipitate from the chamber $e$ into the chamber $a$ takes place by opening the valve $i$ in the pipe $h$. When the valve $i$ is closed, no barium carbonate can pass from the upper to the lower chamber. It is also feasible to draw off the precipitate from the chamber $e$ at first to the outside into a special container (not shown). In case a special pipe is made use of as in Figs. 1 and 2 for discharging the precipitate from the baryta vessel *e* into the lime purifying vessel *a*, I may accurately measure and observe the amount of precipitate so removed. I introduce a measuring vessel *k* as shown in Fig. 2 in order to do the measuring. This vessel may be open above or closed. It is shown closed in Fig. 2.

My process is carried out as follows: The valves *l* and *m* are closed and the air valve *n* and the valve *o* are open so that the precipitate from the vessel *e* containing the barium bath can pass into the measuring vessel *k*. When this vessel is filled, the valves *n* and *o* are closed again and valves *l* and *m* are opened. Through the valve *m* water under pressure passes in, namely water to be purified, and forces the precipitate out of the vessel *k* into the vessel *a*. Through the window *p* the passage of the precipitate to the vessel *k* can be observed. When the precipitate is removed from the vessel *k* the valve *m* is closed.

In the case of waters which contain no bicarbonate and consequently are to be treated exclusively with carbonate of barium, and not with lime water as well, there occurs a collection of worthless precipitate in the barium chamber so that after a certain period a portion of the precipitate which nevertheless still contains barium carbonate must be discharged. For such waters the described process by means of which the cleansing process is divided into steps can also be applied in order to obtain a better utilization of the carbonate of barium. The water to be purified first flows into the chamber *a* in which in such a case no lime need be introduced. Into the vessel *a* however the partially exhausted barium carbonate proceeding from previous water purifications which take place in chamber *e*, is introduced. This barium carbonate is thus almost completely utilized and used up. By this means a partial removal of the sulfuric acid compounds contained in the water takes place in the vessel *a*, while the complete purification takes place in the chamber *e* by means of the fresh barium carbonate contained therein.

What I claim is:

1. The process of purifying water which consists in passing water through a barium bath and utilizing the deposit therefrom containing unspent barium carbonate to effect a preliminary and partial purification of the water.

2. The process of purifying water which consists in passing the water through a barium bath and from time to time removing the deposit formed, containing unspent barium carbonate, and admitting it to the water prior to the barium bath.

3. The process of purifying water which consists in first removing bi-carbonates or the like by means of lime and then passing the water through the barium bath to remove sulfuric acid or the like and admitting the deposit from the barium bath, containing unspent barium carbonate, to the water undergoing the lime reaction.

4. The process of purifying water which consists in treating the water with barium carbonate and causing the water as a preliminary treatment to exhaust the unspent barium carbonate in the deposit obtained from the reaction.

5. The process of purifying water which consists in separately removing bi-carbonates or the like from the water by means of lime, and sulfuric acid or the like by means of barium carbonate and causing the water before treatment with the barium carbonate to exhaust the unspent barium carbonate from the deposit formed in the main barium reaction.

6. The process of purifying water which consists in removing sulfuric acid or the like from the water by means of a reagent and utilizing the deposit formed, containing unspent reagent, to effect a preliminary and partial purification of the water.

7. The process of purifying water which consists in separately removing different kinds of impurities from the water by suitable reagents, and utilizing the deposit formed by one of the reactions, such deposit containing unspent reagent, to effect a preliminary and partial removal of the corresponding impurity from the water.

In testimony whereof, I have signed my name to this specification, in the presence of two subscribing witnesses.

PAUL MÜNZER.

Witnesses:
J. WYNERS,
J. F. ZIESECKE.